April 30, 1935.
J. L. ADAMS, JR
1,999,496
STREAM LINE FLOW VALVE
Filed Dec. 8, 1933
2 Sheets-Sheet 2
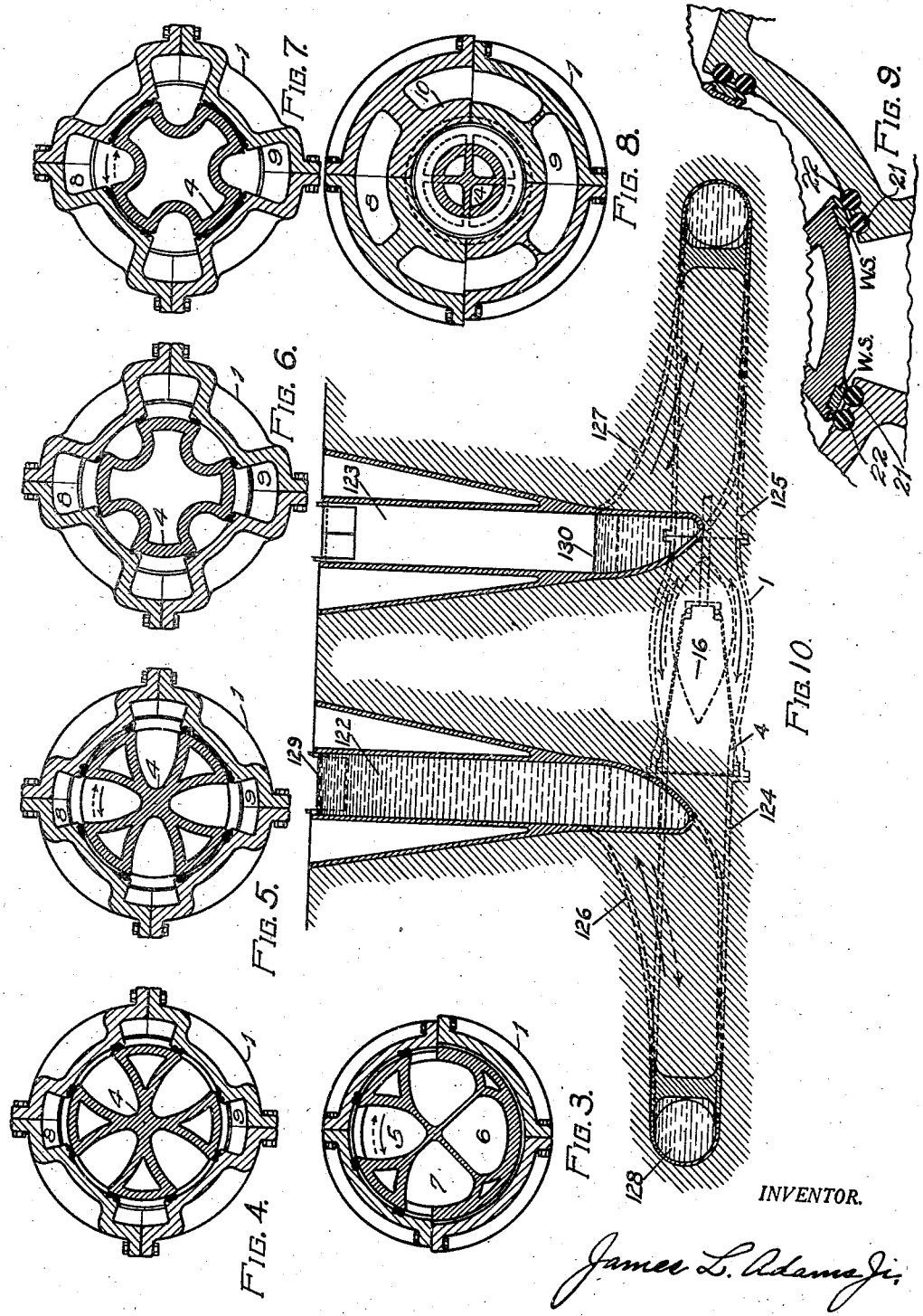
INVENTOR.
James L. Adams Jr.

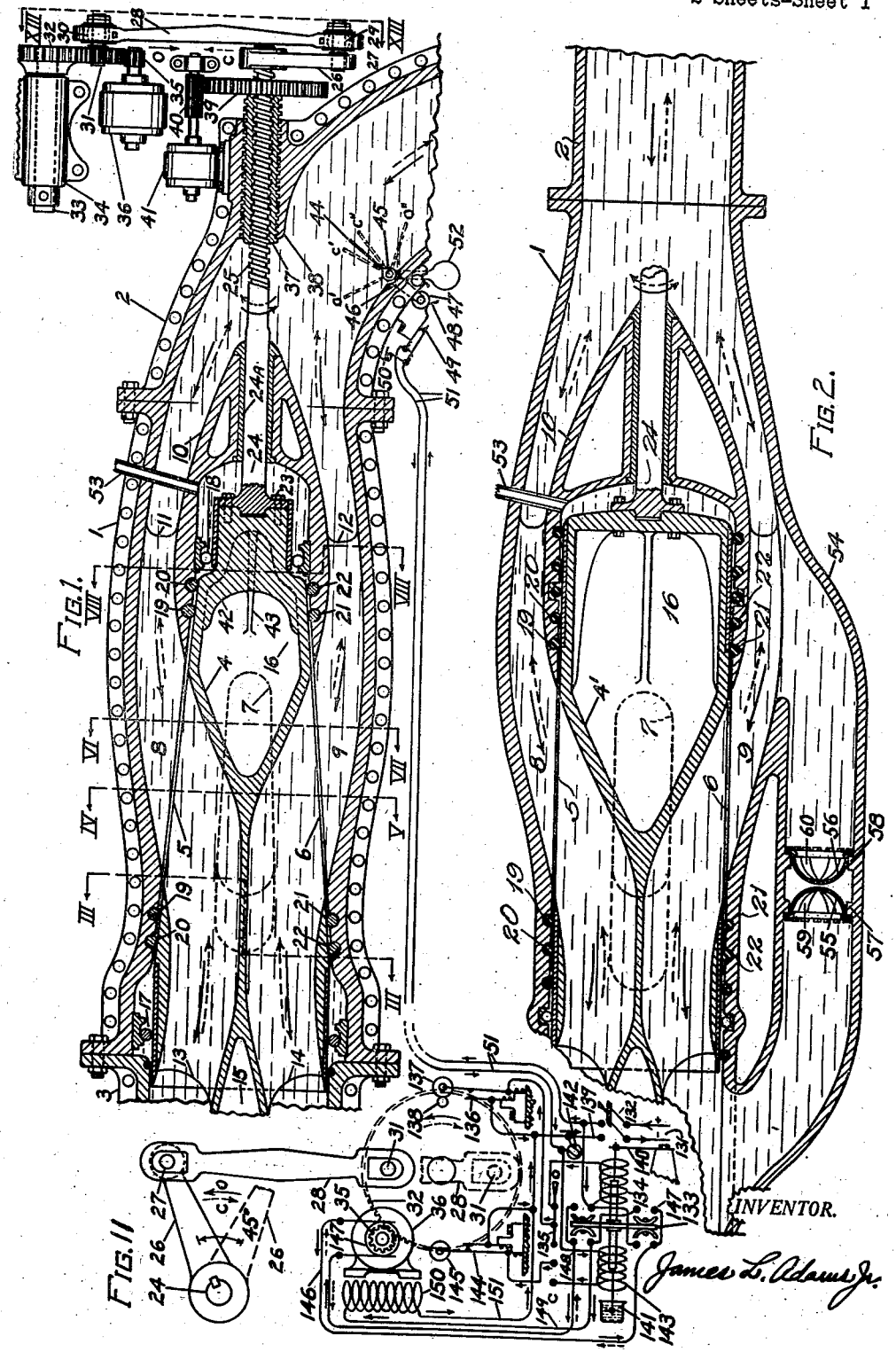

Patented Apr. 30, 1935

1,999,496

UNITED STATES PATENT OFFICE 1,999,496

STREAM-LINE FLOW VALVE

James L. Adams, Jr., Youngstown, Ohio

Application December 8, 1933, Serial No. 701,456

20 Claims. (Cl. 137—139)

My invention relates to the art of hydraulics, and particularly to the development of substantially balanced, stream-line flow valves, adapted to the quick control of the very large volumes of water-flow pertaining to the operation of my oscillation type hydraulic locks, of high-lift form, as shown and described in my copending application on Canal locks, Serial #700,650, filed December 2nd, 1933, although the valves of my present invention are not necessarily limited to such use, or even to the control of water as the operative fluid, or work element. One object of my present invention is to provide an easily operated type of substantially balanced and stream-line flow valve readily adapted to manufacture in ultra-large diameters without introducing any serious mechanical or structural difficulties of construction.

Another object is to provide a valve as above, which at the same time is adaptable to vary quick motion from zero to full-port opening and vice-versa, thus very materially reducing the total loss of head commonly present due to "wire-drawing" during the periods of partial port opening, in very large valves.

Another object of importance is to provide a total mechanism operative to give precision closing at the exact end-of-flow of any one oscillation, or swing, of the liquid content and its connected water-column, by precision timing means.

Another material object is to provide moving valve elements which are substantially floated in place in the water, by the application of buoyancy chambers, thus substantially relieving the bearings from the great weight of the rotor element.

Another object of prime importance is to provide a valve having extremely easy hydraulic bends throughout, with no channels of restricted area whatever.

Another essential object is to provide a multi-port valve in which the division of flows is such as to substantially eliminate hydrostatic unbalance or thrusts in any general direction, or at least reduce the same to a near approach to balance.

Another important object is to provide a valve design in which direct contact metal-to-metal of the valving surfaces is avoided, thereby eliminating the possibility of galling up of the surfaces in contact by the possible intrusion of sand, in the course of normal operation.

A vital object is a valve in which the gasket-elements are so placed as to tend to clean themselves of all sand or other intrusions.

Another object is to provide for take-up to compensate for wear at the gaskets, and a further object to provide means whereby the valve may be opened and closed without contact between relatively moving sealing surfaces, if desired, the final sealing closure being then made by a short longitudinal motion provided by screw or other means.

Another object is to provide means for precision travel to exact open and closed positions, respectively, thus obviating stoppage at a partial port opening.

Yet an additional object is to provide convenient means for emergency relief from water-hammer, preventing possible breakage of valve and associated connecting passages, in case of accidental wrongly timed closure occurring.

Still other objects will be self evident to anyone skilled in the art of valve construction and operation, and the principles of hydraulics.

With all these and other objects in view, I have shown and described a preferred, and an alternative construction which for the first time combine all these essential requirements in practical embodiments, but which are to be taken as illustrative of my invention, and not as limiting the same, or the scope of my broader claims.

In the drawings, Figure 1 shows a vertical axial section of a substantially balanced stream-line flow type of multi-port valve with appropriate operating mechanism;

Figure 2 a similar view of an alternative construction which is more nearly balanced hydrostatically than that of Figure 1, but more difficult to compensate for normal wear, which latter will much exceed that of the Figure 1 construction.

Figure 3 is a transverse section of Figure 1, in closed position, taken on the offset line III—III, looking with the arrows.

Figures 4 and 5 are similar transverse sections of Figure 1, in closed and open port positions respectively, and taken on line IV—V, again looking with arrows. Figures 6 and 7 illustrate similar sections taken on line VI—VII, with the arrows.

Figure 8, a similar section taken to right of the port openings, shows an offset view taken on the line VIII—VIII, of Figure 1, looking with the arrows, and intended to show the progressive thinning down of the radial partitions in the external passages, to a final knife-edge just beyond the section line.

Figure 9 is an enlargement of a part of Figure 4, to better show the seal means.

Figure 10 shows in partial section and part elevation, the application of my valve of Figure 1 to one of the forms of high-lift twin-locks as covered by my copending application before mentioned.

Figure 11 shows a wiring diagram pertaining particularly to my Figure 1 valve, but readily alterable to apply to the other types shown as alternative constructions, the gear, connecting-rod, and crank-arm elements shown being as viewed on the line XIII—XIII of Figure 1, taken in the direction of the arrows, except that relative shaft positions are reversed, to get valve main-shaft substantially in line with that of Figure 1, lying adjacent thereto. Figure 11 also indicates the means provided to get precision 45 degree travel in main valve rotor, from 180 degrees of motion in the large driving gear and connected crank-pin.

In all the figures the same parts are designated by identical part numbers, and motions just completed, by solid direction arrows, that movement which is next to follow being indicated by the broken line arrows in every case.

Referring now more particularly to Figure 1, which shows my preferred construction, a plural part, and preferably axially sub-divisible main valve shell is indicated at 1, with the associated easy hydraulic bend at 2 on the right, and on the left, a further large diameter passageway 3 leading to a long and substantially horizontal water-column shown in a later figure. Suitable bolting means is provided to properly tie together the respective parts of the above, while within the shell 1, and rotatably mounted for easy movement with respect thereto, is the main valve rotor 4, here indicated as of the four-port type, of which the top and bottom ports 5 and 6 which are of full stream-line flow type and together give substantially balanced hydrostatic operation, are shown in section, while in dotted outline to the rear, one port 7 of the similar but horizontally positioned pair can be made out, all providing water-flow passages of very easy hydraulic radii, without constricted areas at any point, and when open connecting up with the similarly designed external passage-ways 8 and 9, around the stream-line flow type rotor-mounting head 10, in turn carried from 1, by the wedge-shaped radial-fins 11 and 12, shown in section in a later figure, and which narrow down to a knife-edge at about the number positions indicated.

The metal parts between the ports 5, 6, and 7, on the rotor, similarly narrow down to knife edges at the 13, 14 positions to the left, where they carry the closed, hollow, bulb-shaped buoyancy chamber 15, all of stream-line flow type, but of which only the right end is shown on the drawings, because of space limitations. The right-hand end of the rotor 4 carries the similar float 16, also of stream-line flow outline at its left, and together with chamber 15 designed to just float the entire rotor element of valve, so that the anti-friction bearings 17, 18, preferably of ball-type, and of stainless-steel, will be substantially relieved of the tremendous weight of the moving rotor 4, such as will normally pertain to a pressure valve attaining some 40 to 80 feet overall diameter, as for large locks. Note that the ball-bearings are so made as to allow for some axial travel, to a small extent, with the inner race made entirely flat, to permit ready removal of rotor to a considerable distance to one side, when required for inspection uses.

Laid in a grooved channel completely and closely surrounding the upper port or passageway 8, in the stationary element or shell 1, is the large diameter solid rubber gasket 19, preferably with one or more similar gaskets 20 laid closely parallel thereto. A similar set, as 21, 22, surround each of the other port openings, in turn, as better indicated on a later enlarged sectional view. Solidly bolted at 23, to the right end of rotor 4, is the large diameter shaft 24, which may be made hollow for approximate flotation in the fluid element, if desired, and will be rotatably carried in the lignum-vitae or other suitably lined bearing 24a, mounted in the stationary head 10. This shaft 24 is preferably, but not necessarily, coarsely threaded at 25, with its extreme right end solidly keyed to the long crank-arm 26, carrying the crank-pin 27, operatively connected with the long connecting-rod 28 through the spherical seat brasses 29, with similar brasses 30, mounting opposite end of rod upon the 180 degree motion crank-pin 31, carried by the very geared bull-wheel 32, in turn mounted upon very heavy shaft 33, within appropriate bearing 34, and driven by pinion 35, of motor 36, or an equivalent propelling element.

Shaft 24 is supported in its threaded portion 25 by the inside and outside threaded bushing 37, having its respective threads both of the same hand, but of slightly different pitch, and carried by the internally threaded boss 38, in shell 2, bush 37 being solidly keyed to the large diameter spur gear 39, rotatable by the long pinion 40, suitably mounted for rotation by motor 41, provided for the gasket tightening adjustment of valve, although it may be used for the actual final seating of the valve at the end of each throw, if desired, and again for longitudinally breaking the seal, just before each opening thereof, so that the valve motion proper will be substantially non-frictional throughout.

Note that the float opening 16 really extends pretty well into the shaded area to the right, as indicated by dotted outline, but that in the figure the section happened to come in the centre of a relatively thin rib 42, similar to that shown at 43, just below, which is 90 degrees therefrom.

Also note that opposite maximum diameter of float-chamber 15, at left of figure, the walls of passage 3 should be bulged outward somewhat, to maintain uniform areas.

Opposite connecting-rod 28, the solid arrow marked O refers to the opening direction of motion, while the broken arrow C indicates the direction of valve closing, for said connecting-rod. In order to accurately control the precision closing of the valve ports 5, 6, 7, and others which may be present, at the exact moment of zero-flow of the water-column concerned, so as to reduce to an ultra minimum all loss of head in the canal lock as due to this cause, I have provided at 44 a device for this purpose, comprising preferably a freely swung vane of considerable area, carried by the easily rotated shaft 45, properly mounted by anti-friction bearings of usual type in the shell 2, outside which said shaft has keyed upon it the swinging arm 46, mounting at its end the insulating roller 47, contacting at the position shown only, with the suitably bent spring 48, operative to close the normally open contacts 49, properly mounted on the insulating base 50, and connected by the leads 51 with the electrical control to be described in connection with a later figure, as shown to the left of Figure 1. Also keyed on shaft 45, is the weighted pendulum 52 normally tending to hold vane 44 in its shown position, but which with full flow of the liquid in the direction of the solid arrow, permits 44 to deflect temporarily to the O' position, for the reversed full flow, as per broken line arrow, to the O'' position, while during the gradual decrease of flow at ends of these respective water-column movements, vane 44 gradually drops back from its O' to its C' position, or from its O'' to its C'' point, as the case may be, at which latter C' and C'' points, the contacts 49 close, and the signal goes thru over leads 51, to start the valve closing mechanism, so that by the time the water motion has come to exact zero, the closure will have been brought about, the exact position of C' and C'' required, being determined once for all by actual trial, and contact spring 48 set accordingly. Through a suitable opening 53, into head 10, a moderate sized pipe (not shown) is run to a point outside the valve casing and across to connect with interior of left-hand connecting shell 3, through an appropriate opening similar to 53, and all provided for hydrostatic balance purposes, to substantially eliminate the greater portion of the end thrust upon the rotor 4, when in its closed position.

In Figure 2, a type of rotor 4' is shown, in which this end-thrust may be brought down to substantially zero, if desired, by a piping connection similar to that just described above, but this type of valve is difficult to adjust to compensate for any wear or lack of tightness in its gasket system, because it is parallel sided, and not coned, as was the previous figure.

It looks as though a compromise between the steep coning of Figure 1, and the parallel-sided rotor of Figure 2, would be the finally preferred construction, giving substantially complete hydrostatic end-balance, as well as a sufficient amount of sealing-gasket adjustment at points 19, 20, 21, 22, and so-forth, around the remaining ports not shown in Figure 1.

Supplementing parts shown in Figure 1, and also applicable to the latter, if desired, I have shown in Figure 2 the fairly large diameter by-pass passage 54, of substantially stream-line construction, and containing the two well dished and opposed thin metal diaphragms 55, 56, tightly gasketed with rubber where bolted to the inwardly projecting circular rings 57, 58, integral with by-pass 54, said diaphragms 55, 56 being deeply scored radially to about ⅔ thickness, along the lines 59, 60, or some equivalent pattern, to make sure of a full-opening break in case of emergency-operation under water-hammer conditions, this provision not being made for expected probabilities, but just in case of some break occurring in the valve-functioning mechanism, or its connected parts.

If either diaphragm 55, or 56 gives way, the other will surely crumple up and follow, but if any attempt is made to substitute a single flat partition here, this will weave back and forth considerably, with each oscillation of the water, and almost surely break eventually, without the required water-hammer cause, while the diaphragms of my construction shown, will not so weave and fracture, and hence will not break under normal operating conditions, if given a reasonable factor-of-safety as to thickness utilized.

Note that the by-pass passage 54 need not be anywhere near as large as the entering portion of main valve shell 1, because considerable velocities in 54, and therefore frictional effects, are desired in case of a diaphragm break.

In Figures 3 to 9, inclusive, no new parts appear, requiring identifications, except the renewable wear-strips WS.

Although not entering into my present invention directly, but necessary to a complete understanding of the requirements to be met thereby, I have shown in Figure 10 a transverse section of one form of my twin oscillating lock system, 122, 123 of the high-lift type, and suitable for canal use, with the valve 1 of Figure 1 indicated by dotted lines, as being located in the more distant background, and about in the mid-length of the long and substantially circular length of water-column, 124, 125, connected with the respective locks thru the Venturi sections 126 and 127, respectively, and both of very easy divergence angles, as a plan view would show. The major length of the water-column 124, 125 in the extreme background, is of the section indicated at 128, however, and the figure shows the respective water heights, 129, 130, at the end of a complete swing into the left-hand lock 122, as indicated by the solid-line arrows. For further details the co-pending application previously referred to may be consulted.

In Figure 11 I have indicated partly as a wiring diagram, and partly as a skeleton outline of directly operated elements, the means proposed for attaining substantially automatic control of valve-rotor 4 of Figure 1, for precision quick closing of the ports at the exact end of swing of the water-column 124, 125, of Figure 10. Here I have indicated the incoming power lines 131, which may be of any convenient type, but shown as direct-current for simplicity, connected through the main control switch 132, whose right-hand outgoing line connects both to signal contact 49, and to the points indicated on reversing contactor 133, including one end of operating shunt coil 134, whose remaining end leads to the O or opening throw of the selector switch 135, shown closed in this direction, thereby connecting to one side of contacts 136, which have just been opened by completion of the opening-up motion to bring the valve to position shown in Figure 1, whereby insulating roller 137 has been contacted with projecting pin 138, mounted upon side of gear 32, forcing contacts 136 apart, and opening circuit through coil 134, which up to this point had been closed through line 139 to left-side of switch 132. Contactor 133 therefore, under the influence of the return spring 140, and suitably retarded to prevent over-running, by the dash-pot 141, opens to position shown.

Valve rotor 4, of Figure 1, being now in its full open position, as there shown, the water-column promptly gets under way, deflecting vane 44 until contacts 49 open up, and quenching pilot-light 142, connected between the return line of circuit 51, and return side 139, of switch 132.

If operator wishes valve to close automatically at the end of this present swing of the liquid, then as soon as pilot light 142 extinguishes, indicating that signal contacts 49 have opened up, he throws selector switch 135 to the left-hand or C position, and leaves it there for the present.

As this swing of the water-column now dies down and approaches zero sufficiently, contacts 49 again close at proper instant, permitting a circuit to be traced from right side of switch 132, through the leads 51, and contacts 49, back to and through left-hand or "closing" shunt coil 143, thru the now closed C or "closing" side of selector switch 135, into the normally closed contacts 144, operable by the insulating roller 145, now idle, and on to lead 139, on return side of switch 132, thus causing contactor 133 to snap over to the left, or "closing" side, whereupon a circuit is formed from right side of switch 132 to lower left-hand set of bridging contacts on 133, out through line 146 as indicated by the dotted arrows, through armature 147, back through line 148 as per the dotted arrows, through the left upper bridge contacts of contactor 133 and lead 149 to motor series coil 150, and out through conductor 151 to line 139 again, on left-side of switch 132, causing motor 36 to start up, and through pinion 35 drive gear 32 in its dotted arrow or clock-wise direction, or until 31 at top has been brought to the 31 bottom position, carrying connecting-rod 28, and crank-arm 26 along with it, thereby swinging shaft 24 through the required precise 45 degrees to close all the ports in valve-rotor 4, connected thereto.

This travel of gear 32 also brings pin 138 around into contact with roll 145, opening up contacts 144, causing contactor 133 to return to mid-position, and shutting down motor 36, until such time as selector switch 135 may be again thrown to its right-hand or "opening" position, whereupon the originally mentioned circuit may be traced from switch 132 through its right side to "opening" coil 134 on contactor 133, on to O side of switch 135, as shown, through contacts 136, now closed, as pin 138 is 180 degrees away, and back to lead 139, and left-side of switch 132, pilot light 142 being likewise illuminated, since contacts 49 are closed, at the start. Contactor 133 now promptly closes to the right, permitting a circuit to be traced from right side of 132, across to upper right bridge on 133, through line 148, and now in the solid arrow direction to armature 147, back thru line 146 to lower right bridge of 133, up and through lead 149 in same direction as before, to and thru series coil 150, and back thru line 151 to lead 139, on left side of switch
132. Since armature circuit only has been reversed, motor 36 will reverse also, carrying crank-pin 31 bottom to its 31 top position, and stop pin 138 back to position shown, opening up contacts 136, and stopping motor here.

The crank-arm 26 being now again in its full "open" location, valve 1 permits the water-column to get under way promptly, the signal contacts 49 open up once more, extinguishing the pilot light 142, and thereby signalling operator that he may throw selector switch 135 again to the left or "closing" position as soon as convenient, thus again setting up the proper conditions for succeeding automatic stop, as the water-column again slows down in velocity toward zero value.

If preferred, the signal contacts 49, and the pilot light 142 may be used to give the proper timing signal to operator, and the switches arranged for his direct manual control, without the automatic-contactor features, the contacts 136 and 144 being then utilized to operate signal lights for his guidance, as a simplified alternative construction.

Switch 132 would of course be placed in a suitable metal housing, under lock and key, so as to avoid any tampering with the system by unauthorized parties.

Reverting for a moment to Figure 1, it will be observed that shaft 24, and with it the valve-rotor 4, screws in a little during "opening" and out again on "closing", so that the moment the rotor starts to open its ports, the pressure on the gaskets therearound releases, resulting in a minimum of wear, and with the sequence reversed during the closing operation, for the same reason.

Note that the connecting rod 28 was given ball brasses 29 and 30, in order to permit this limited amount of swiveling action, and that if found preferable, the rotor may be completely closed without its gaskets being brought into contact at all, the latter being then promptly effected by operating motor 41, gear 39, and its keyed sleeve or bushing 37, dis-similarly threaded on inside and out, as heretofore noted, this process being carried through in reverse for "opening". Such methods of decreasing the frictional contact and wear, are believed to be very important in valves of the great size contemplated herein.

Note that the grooves cut for reception of all the solid rubber gasket-rings shown, are carried well past the mid-diameter of the latter, as better shown in Figure 9, so that the rings tend to stay-put in proper place, but yet may be easily forced into the groove, or forcibly pulled out if required, for replacement, or shift to a new operating position, after wear.

These rings have been shown and described as solid, but they might conceivably be made hollow, like a heavy walled "balloon" tire, if preferred.

In the operation of the valves of my present invention, it will be observed that they have many excellent features such as rotational advance of the immediate valving elements, the use of gasket seal-rings throughout, the full stream-line flow passages of substantially constant cross-section throughout, as provided at the open position, substantially floated moving elements, the ready application of water-hammer relief means, and the substantially straight-line flow design.

At full "open" position, as well as at all operating positions, they are substantially balanced hydrostatically, mechanically, and as to weight, so that they are ultra easy to either open or close, and they provide for an ultra-minimum of friction and wear, as well as of possible galling up of opposed metal surfaces, while Figure 1 is easily compensated for wear by adjustment.

The rotors in Figures 1 and 2 may be uncoupled, and shifted to the left as far as required, as inside the shell 3 of Figure 1, for any inspection or repair purposes, after draining the water-passages by any suitable well known means.

Thus it will be observed that in the operation of the valves of my invention, certain very definite advantages accrue from their substantially straight-line, and stream-line flow construction, with constant cross-sectional areas throughout, when at full "open" position, their substantial absence of sudden offsets or sharp bends and twists, productive of eddies and resultant friction losses, their easy operation, under substantially full-floating balance at all times, and the minimized friction and wear, with no metal-to-metal contacts at the port areas, and the simple means for protection from possible water-hammer. In addition, the wearing elements are readily replaceable, or capable of easy re-surfacing, as the case may be, and all ball-bearings are of the rustless-steel or equivalent alloy type.

For somewhat related valves, applicable to the same uses as those above described, reference may be made to my co-pending divisional application, Serial #742,945, filed September 6th, 1934.

Under the tremendous total hydraulic pressures developed over the necessary port areas of valves of a size appropriate to the use here intended, the customary gate-valve becomes a physical impossibility, both as to its structure, and its opening-up under pressure, as well as to the considerably greater eddy losses as compared with the valves of my invention, and it is vastly slower in its action, again making it impractical for the purpose intended.

Having shown and described preferred and alternative embodiments of my invention, and described its mode of operation, under the intended use, what I claim is:

1. In a fluid control valve, a horizontally rotatable and substantially circular-sectioned valve-element of the substantially floated type, a stationary enclosing-shell providing therebetween at the full "open" position a substantially stream-line and nearly straight-line passageway for the operative fluid, said passageway being of substantially constant transverse cross-section throughout, and a precision-throw valve-rotating means providing quick-opening to and closing from exact full-port position.

2. In a fluid control valve, a substantially floating valve-element, power propelling means therefor, providing both longitudinal and rotational motions concomitantly in said valve-element, and a stationary enclosing shell for said valve-element and providing therebetween at the full "open" position of valve a substantially stream-line passageway of substantially constant cross-section throughout.

3. In a fluid control valve, a substantially floated valve-element, combined longitudinal and rotational propelling means therefor, of precision travel type, and applicable to and from successive open and closed positions of said valve-element, an enclosing shell forming at "open" position a substantially stream-line and nearly straight-line passage around said valve-element, elastic seating-elements embedded in said enclosing shell but slightly protruding from the seating surfaces thereof, and included means providing high compression of said seating-elements at the "closed" position of valve.

4. In a fluid control valve, a rotatable and substantially floated valve-element, an enclosing shell therefor, said shell and said valve-element providing a substantially stream-line passage therebetween at full "open" position of valve, said passage being of substantially constant transverse cross-section at successive positions therealong, and co-operating signal means operatively connected with a power closing means on said valve, and determining the time of closure thereof.

5. In a fluid control valve, a substantially floated and readily rotatable valve-element, power means providing longitudinal progression concomitantly with rotation thereof, an enclosing shell around said valve-element, and providing a substantially stream-line passage therebetween at the "open" position of valve, elastic seating-elements on said shell and for said valve-element, and included means providing immediate release of compression on said seating-elements as valve starts to open.

6. In a fluid control valve, a substantially floated and power-propellable valve-element of the rotating type, an enclosing shell therefor which provides at full "open" position of valve a substantially stream-line passage therebetween of substantially constant cross-section, and propelling means applied to give a precision throw to said valve-element, and rotationally operative substantially on longitudinal axis of said shell and between separated open and closed positions of said valve.

7. In a fluid control valve, a substantially floated and essentially circular valve-element, an enclosing shell providing a substantially stream-line passage therebetween at about full "open" position of valve, and a power-propelling means applied to said valve-element and providing longitudinal advance thereof concomitantly with rotation of said valve-element to the respective open and closed positions.

8. In a fluid control valve, a substantially floated and essentially hydrostatically-balanced rotatable valve-element, an enclosing shell providing at full "open" position of valve a substantially stream-line passageway for the operative fluid therebetween, which passageway is of substantially constant successive transverse cross-sections throughout, and a power-shifting means applied to said valve-element to seat and unseat the same.

9. In a fluid control valve, a substantially floated and concomitantly hydrostatically balanced working valve-element, an enclosing shell therefor, and providing a nearly stream-line passageway of substantially constant cross-section for the operative fluid therebetween, a power-shifting means of precision travel type applied to said valve-element to "open" and "close" the valve successively as desired, and a water-hammer protective means consisting of twin opposed thin hemi-spherical shells and applied to a by-pass around said valve.

10. In a fluid control valve, an essentially circular cross-sectioned valve-element, an enclosing shell therefor, said shell providing a substantially stream-line and constant water-cross-section passageway therebetween at the "open" position of valve, and quick-acting power-shifting means applied to said valve-element, and operative to give both rotational and longitudinal motion thereto, and to elastically compress the sealing means provided at "closed" position of valve.

11. In a fluid control valve, a valve element, an enclosing shell therefor, said shell providing a substantially stream-line passageway therebetween at "open" position of valve, power-shifting means applied operatively to said valve-element, and a signal control applied to said power-shifting means and determining closure of valve at substantially minimum fluid-velocity conditions.

12. In a fluid control valve, a rotatable multiport valve-element mounted in substantially hydrostatic and weight balance, an enclosing shell providing a substantially stream-line and nearly straight-line passageway therebetween at full "open" positions of valve, power means operable to give precision angular motion to said valve-element between open and closed positions, and automatically re-setting water-hammer protective means applied to said enclosing shell for safety purposes.

13. In a fluid control valve, a movable valve-element, an enclosing shell providing a substantially stream-line and constant-section passageway throughout at near "open" positions of valve, valve-element shifting-means, control-signal means connected to said shifting means and determining the closure of valve-element at near zero flow of the liquid operative element, and included means determining the precision length of throw of said shifting means.

14. In a fluid control valve for an oscillating lock system, a substantially stream-line liquid-passage through said valve, said liquid-passage being of substantially constant transverse cross-section at successive longitudinal positions through said valve when at the "open" position, and connected quick-acting power-means operable to close off said valve substantially at the instant of zero flow of the operative fluid, under the control of a velocity indicator mechanism connected thereto.

15. In a fluid control valve attached to an oscillating canal lock system, a valve-unit, attached power-means providing quick mechanical closure of said valve-unit, and a velocity-fall indicator attached to said system and connected with said power-means, said indicator including means pre-determining the low velocity of contained liquid at which closure of said valve-unit is initiated.

16. In a fluid control valve applicable to an oscillating water-column, a valve-element, an enclosing shell providing a near stream-line passage therebetween, power-means applicable to quick-closure of said valve, connected control-means governing the start of said power-means, said control-means including a precision indicator of minimum water-flow velocities, operatively co-ordinated with said power-means.

17. In a fluid control valve applied to an oscillating water-column system, a substantially floating and nearly hydrostatically balanced valve-element, an enclosing shell providing at full "open" position of valve a nearly straight-line and nearly stream-line passageway therebetween, attached power-shifting means providing precision quick-opening of said valve to precise full "open" position, and similarly precise quick-closure in order to minimize "wire-drawing" friction losses, said closure being under control of a connected low-velocity indicator, operatively connected with said power-shifting means.

18. In a fluid control valve, quick-acting power-means applied to the moving element thereof, and a low-velocity indicator applied to the liquid-flow channel, said indicator being operatively connected with said power-means, and including a control-means determining the instant of closure of said valve by said power-means.

19. In a fluid control valve, a movable valve-element, connected power-means determining precision travel of said valve-element to fully open and fully closed positions successively, and each at high-speed so as to minimize "wiredrawing" and resultant loss of head, said power-means being under manual control during "opening" of valve, and successively under manual and automatic liquid-velocity controls during the "closing" operation.

20. In a fluid control valve, a substantially floated valve-element mounted in approximate hydrostatic balance an enclosing shell containing seat-rings of elastic and compressible non-metallic material, and power-shifting means applied operatively to rotate said valve-element, and providing compression contact thereof with said seat-rings at substantially the closed valve positions only.

JAMES L. ADAMS, Jr.